United States Patent [19]
Russell

[11] 3,976,099
[45] Aug. 24, 1976

[54] MULTIPLE-PASSAGE, QUICK-DISCONNECT COUPLING

[75] Inventor: Duane K. Russell, Bothell, Wash.

[73] Assignee: Western Gear Corporation, Everett, Wash.

[22] Filed: Sept. 30, 1974

[21] Appl. No.: 510,472

[52] U.S. Cl. ................ 137/614.01; 91/167 R; 91/189 R; 137/506; 137/614; 137/614.06
[51] Int. Cl.² ......................................... F16L 29/00
[58] Field of Search .......... 137/494, 614, 594, 506, 137/614.01, 614.06; 91/167 R, 189

[56] References Cited
UNITED STATES PATENTS

| | | | |
|---|---|---|---|
| 2,471,798 | 5/1949 | Thomas | 137/594 X |
| 2,625,168 | 1/1953 | Charlson | 137/614.01 |
| 3,127,189 | 3/1964 | Schultz | 137/494 X |
| 3,168,906 | 2/1965 | Brown | 137/614 X |
| 3,170,486 | 2/1965 | DeWitt | 137/614 |
| 3,348,575 | 10/1967 | Simak | 137/614.06 |
| 3,375,845 | 4/1968 | Behm | 137/614 X |
| 3,479,005 | 11/1969 | DeGraaf | 137/614.06 |
| 3,550,624 | 12/1970 | Johnson | 137/614 |
| 3,621,872 | 11/1971 | Fisher | 137/494 |
| 3,691,904 | 9/1972 | Pesci | 91/189 X |
| 3,731,705 | 5/1973 | Butler | 137/614.06 |
| 3,777,771 | 12/1973 | DeVisscher | 137/614.04 X |

Primary Examiner—Martin P. Schwadron
Assistant Examiner—Abraham Hershkovitz
Attorney, Agent, or Firm—Seed, Berry, Vernon & Baynham

[57] ABSTRACT

A rigid, multiple-passage, quick-disconnect coupling in which valves of a supply section of the assembly are moved to mechanically open valves in a receiver section for enabling pressurization of telescopic cylinder sections. Energization of the innermost cylinder section automatically actuates the valves for enabling pressurization of the remaining cylinder sections. The coupling sections have opposed valve surfaces substantially flush with the surrounding surfaces of the coupling sections.

13 Claims, 4 Drawing Figures

MULTIPLE-PASSAGE, QUICK-DISCONNECT COUPLING

BACKGROUND OF THE INVENTION

1. Field of the Invention

This application relates to fluid couplings and, more particularly, to fluid couplings used in multiple-passage conduits or cylinders.

2. Description of the Prior Art

In any application where hydraulic fluid is to be transported from one point to another by a conduit, it is often necessary or desirable to quickly and easily connect and disconnect portions of the conduit. Hydraulic couplings or connectors suitable for use in joining one conduit to another are well known in the art. However, these connectors generally include a protruding portion which fits into a recessed portion. Several problems arise from this particular arrangement. Since these connectors are frequently used in hostile and dirty environments, dirt and other foreign matter frequently accumulate within their recesses. When the protruding portion is fitted into the recessed portion and fluid is allowed to flow, this dirt mixes with the hydraulic fluid. Furthermore, when the protruding portion is fitted into the recessed portion, air is frequently trapped therein, causing air bubbles to form in the hydraulic fluid.

Even under circumstances where these prior art connectors would work properly for joining single-passage conduits, it was frequently difficult to devise such connectors that would simultaneously join multiple-passage conduits.

Because of these many disadvantages, there has been a great need for a hydraulic connector that could be quickly and easily connected and disconnected without allowing air or foreign matter to enter the fluid and which could be used to join conduits having multiple passages.

SUMMARY OF THE INVENTION

It is an object of the present invention to provide a coupling suitable for use in multi-passage conduits and which may be quickly connected and disconnected without the use of skilled manpower or specialized tools.

It is a further object of the present invention to provide a quick-disconnect coupling suitable for joining multipassage conduits wherein the coupling will automatically close when the conduits are depressurized.

It is still another object of the present invention to provide a multiple-passage, quick-disconnect coupling which has no dirt catching recesses.

It is a still further object of the present invention to provide a multiple-passage, quick-disconnect coupling that will not trap air within the valve structure.

It is another object to provide a multiple-passage, quick-disconnect coupling that automatically enables pressurization of the remaining passages when one passage is pressurized.

Basically, one feature of the invention is to provide a two-section coupling having a first valve operative when pressurized to move from one section to positively open a mating valve in the second section and simultaneously to open the other valves in the two sections for enabling the pressurization of the conduits connected to the other valves.

These and other objects of the present invention are accomplished in a preferred embodiment by providing a multiple-passage, quick-disconnect coupling consisting of a supply assembly and a receiver assembly. The supply assembly has a smooth, flat top surface. The supply assembly contains a plurality of valves, each valve having a top surface which is flush with the flat top surfaces of the supply assembly. The valves are opened by being raised above the flat top surface of the supply assembly. Each of the valves is actuated by a spindle connected to a piston mounted in a hydraulic cylinder. A control fluid port is provided for passing fluid to the pistons and to raise the valves above the flat top surface to open the valves. A plurality of fluid inlet ports are in communication with the inlet side of the valves.

The receiver assembly comprises a cylindrical member with a flat bottom surface. The receiver assembly contains a plurality of valves, each valve having a bottom surface which is flush with the flat surface of the receiver assembly at a location aligned with the valves in the supply assembly. The valves in the receiver assembly are opened by having their flush surfaces mechanically depressed by the supply assembly valves into the flat bottom surface of the receiver assembly.

The flat surface of the supply assembly is held against the flat surface of the receiver assembly by a clamp, with the receiver assembly aligned with the supply assembly so that the valves of each assembly confront one another. Pressurized fluid is then passed into the control fluid inlet of the supply assembly and thence to the pistons of the supply assembly valves, thereby forcing the valve members in the supply assembly into the receiver assembly to open the valves in both the supply and receiver assembly. Fluid is now free to flow into the separate fluid inlets for each valve, through the supply assembly and into the receiver assembly.

When the assemblies are depressurized, all the valves are automatically closed to prevent leakage of hydraulic fluid or ingress of dirt.

Although this multiple-passage, quick-disconnect coupling can be advantageously used to join any multipassage conduits lying horizontally or vertically, it is particularly suited for fastening a multi-cylinder hydraulic ram to a rigid base and its hydraulic supply. It is especially suitable for use where such hydraulic rams operate in dirty environments, such as in oil well drilling rigs.

DESCRIPTION OF THE PREFERRED EMBODIMENT

Figures 1, 2:
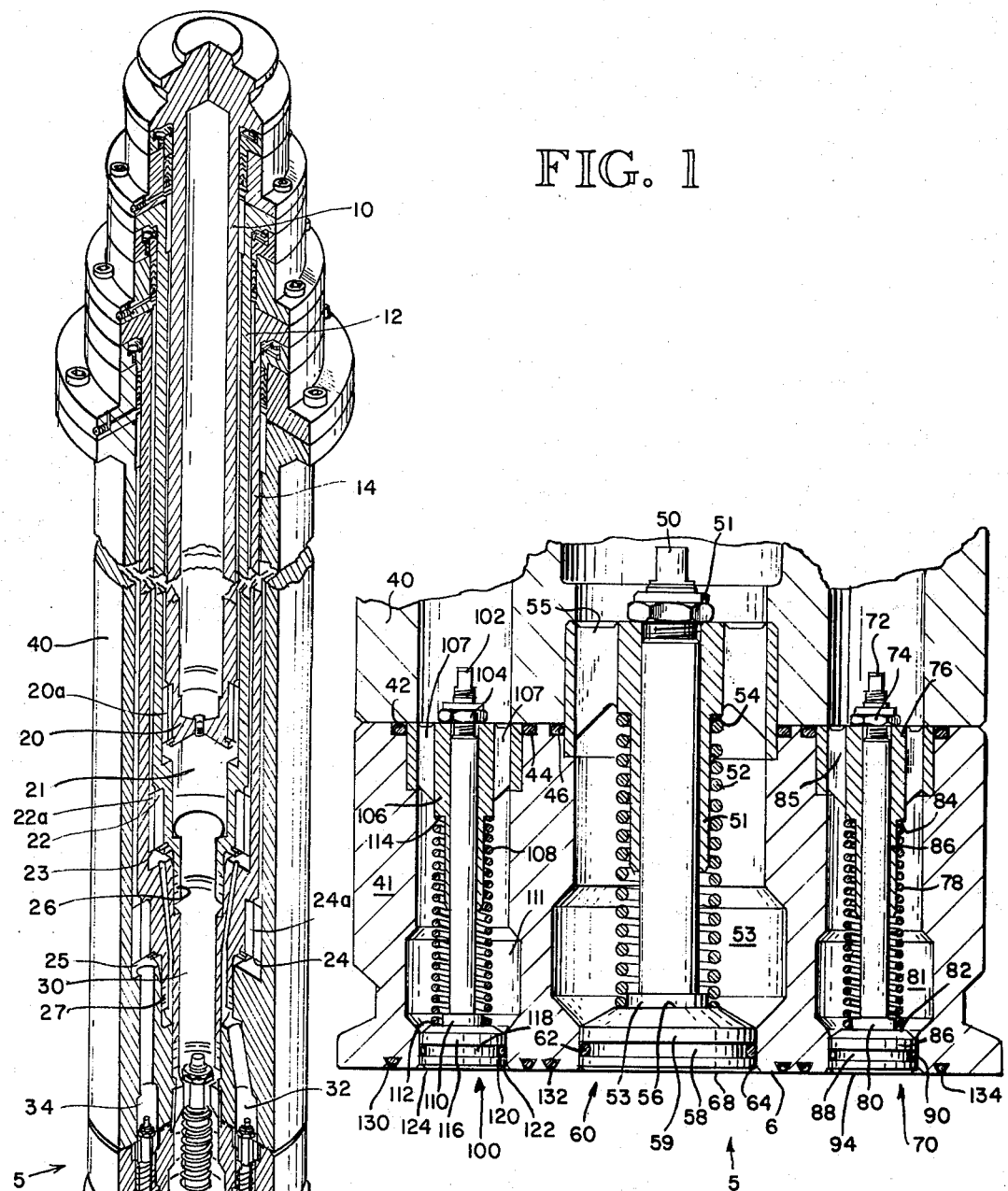
FIG. 1 is a partial cross-sectional view of the quick-disconnect coupling of the present invention as used in a multi-cylinder hydraulic ram showing the receiver assembly separated from the supply assembly.
FIG. 2 is a cross-sectional view of the receiver assembly of the present invention showing the valves in their closed position.

The multiple-passage, quick-disconnect coupling is shown in FIG. 1 as used with a multi-cylinder ram. Inner ram 10 has an end 20 provided with unsealed guide bushings 20a and is urged upward when hydraulic fluid flows into the inner ram cylinder 21 through inner ram fluid port 30, Similarly, the middle ram 12 has an end 22 and is urged upward when hydraulic fluid flows into middle ram cylinder 23 through middle ram fluid port 32. The end 22 has unsealed guide bushings 22a and an axial extension 26 that overlies and is sealed against the inside surface of outer ram 14. When extension 26 is raised off the outer ram 14, fluid from the inner ram fluid port 30 is allowed to flow directly into the middle ram cylinder 23 to extend the middle ram. The outer ram 14 operates in essentially the same manner as middle ram 12. The outer ram 14 has an end 24 and unsealed guide bushings 24a and is urged upward when hydraulic fluid flows into outer ram cylinder 25 through the outer ram fluid port 34. Outer ram 14 also has an axial extension 27 which, when raised off the inside surface of the outer casing 40 by fluid introduced in port 34, enables fluid from port 30 to flow directly into the outer ram cylinder 25.

The multi-cylinder ram has three modes of operation controlled by conventional external valving. In the first mode (high speed), fluid enters only inner ram fluid port 30, thereby raising the inner ram 10. In a second mode (intermediate speed), fluid simultaneously enters both inner ram fluid port 30 and middle ram fluid port 32, thereby raising inner ram 10 and middle ram 12. Similarly, in the third mode of operation (low speed), fluid enters all three fluid ports, 30, 32 and 34, and the greatest amount of power can be achieved; but the rams 10, 12 and 14 will rise the slowest.

Although the operating parameters of each multicylinder ram will vary, depending upon the weight and dimensions of the ram, in one operational embodiment, 100 p.s.i. is needed to overcome the deadweight of the rams.

The receiver assembly 5 is shown in FIGS. 1 and 2 and includes an inner ram valve 60, a middle ram valve 70 and an outer ram valve 100, each of which is mounted flush with the flat surface 6.

The inner ram valve 60 includes a valve 59 having a flat surface 68 and a circumferential recess 58 containing an O-ring 62 which abuts a valve seat 64. The valve 59 is urged downward by a compression spring 52 which abuts a shoulder 56 on the valve member 59 and the shoulder 54. A spindle 50 extends through the compression spring 52 from the valve 59 and threadingly interacts with a nut 51. The nut 51 is adjusted so that the flat surface 68 of the valve 59 is flush with the flat surface 6. When the valve 59 is forced upward, the valve separates from the valve seat 64 to allow hydraulic fluid to flow into chamber 53 through apertures 55 and into inner ram fluid port 30.

The middle ram valve 70 is smaller than the inner ram valve 60 but operates in the same manner. The valve has a flat surface 94 and a circumferential recess 88 containing an O-ring 90 which abuts a valve seat 92. The valve is urged downward by a compression spring 78 which abuts a shoulder 82 and a shoulder 84. Extendng upward through the compression spring 78 is a spindle 72 which threadingly interacts with a nut 74. The nut 74 is adjusted to maintain the flat surface 94 of the valve flush with the flat surface 6. The operation of middle ram valve 70 is the same as the operation of the inner ram valve 60. When the valve is urged upward, the valve rises above the valve seat 92, thereby allowing hydraulic fluid to flow into chamber 81 through apertures 85 and into the middle ram fluid port 32.

The outer ram valve 100 is identical to the middle ram valve 70, both in structure and in operation, and, therefore, it will not be separately described herein.

The casing 40 is secured to a coupling body 41 by retaining bolts (not shown) which extend from the flat surface 6 through a bore in the coupling body 41 and threadingly interact with casing 40. A plurality of O-rings 42, 44 and 46 prevent hydraulic fluid from leaking at the joint between the casing 40 and the coupling body 41. A plurality of O-rings 130, 132 and 134 are provided on the flat surface 94 to prevent hydraulic fluid from leaking when the receiver assembly is connected to the supply assembly 300.

Figure 3:
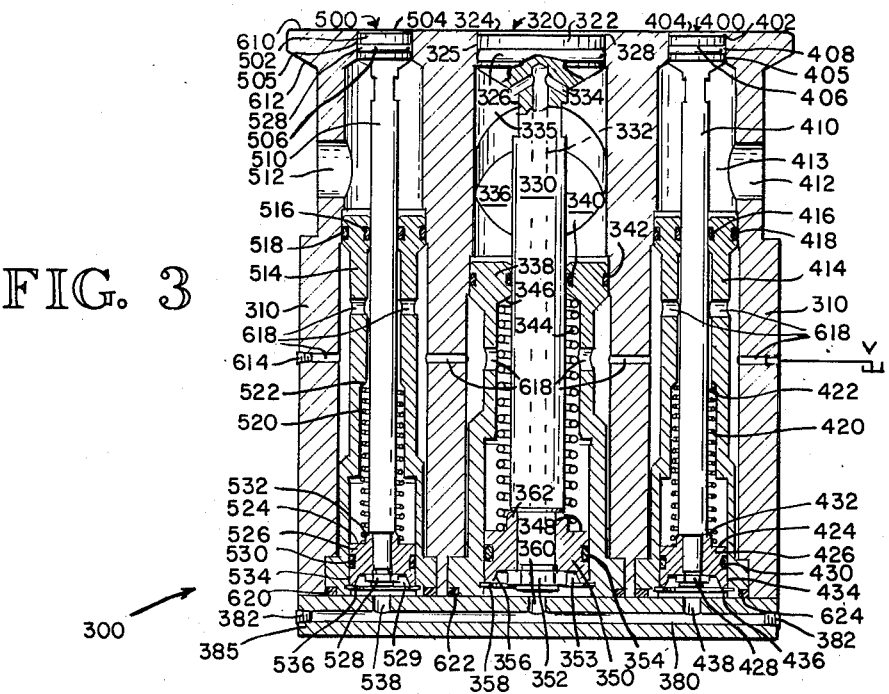
FIG. 3 is a cross-sectional view of the supply assembly of the present invention showing the valves in their closed position.

The supply assembly 300, which mates with the receiver assembly, is shown in FIGS. 1 and 3. The supply assembly 300 includes an inner supply valve 320, a middle supply valve 400 and an outer supply valve 500, all of which are flushly mounted with the flat surface 610.

The inner supply valve 320 has a flush surface 324 and a circumferential recess 326 containing an O-ring 328 abutting a valve seat 325. A cylindrical spindle 330 is connected to the valve and extends downwardly therefrom. The spindle 330 contains an axial cylindrical bore 332 in communication with a chamber 335 through apertures 334. The chamber 335 opens up into a fluid port 336 having suitable fittings (not shown) for connection to a fluid line. The axial cylindrical bore 332 extends downward through the spindle 330 and opens into cylinder 353. Hydraulic fluid flows into chamber 335 through the fluid port 336, down the axial bore 332 and into the cylinder 353, thereby forcing the piston 350 upward to raise the valve above the flat surface 610. A piston 350 is urged downward by a compression spring 344 which abuts a shoulder 348 on the piston 350 and a shoulder 346 on an inner supply valve cylinder 338. O-rings 354, 340 and 342 are provided to prevent the leakage of hydraulic fluid. The piston 350 contains a cylindrical protrusion 362 on which the lower end of the spindle 330 rests and a downwardly extending, cylindrical protrusion 356 which rests on stop 358 to maintain the piston 350 in its proper position. The cylinder 353 also opens into a fluid duct 380 through aperture 360 which, as will be explained hereinafter, allows fluid to flow into the cylinders for outer supply valve 500 and middle supply valve 400.

The middle supply valve 400 includes a flat surface 404 and a circumferential recess 406 containing O-ring 408 which abuts a valve seat 405. A spindle 410 extends downward from the valve and is fastened to piston 426 by retaining nut 428. The piston 426 is urged downward by compression spring 420 which abuts a shoulder 424 on the piston 426 and a shoulder 422 on the middle supply valve casting 414. The piston 426 includes an upwardly extending, cylindrical protrusion 432 on which the lower end of the spindle 410 rests and a downwardly extending, cylindrical protrusion 434 resting on a stop 436 to maintain the piston 426 is its proper position. The piston 426 is forced upward to open the supply valve 400 by hydraulic fluid flowing into cylinder 429 through aperture 438 from fluid duct 380. Therefore, when hydraulic fluid flows into the fluid port 336, the middle supply valve 400, as well as the inner valve 320, are opened. In one operational embodiment, a pressure of between 25 and 30 p.s.i. is needed to open the valves 400 and 320. When the middle supply valve 400 is opened, hydraulic fluid can flow through fluid port 412, through chamber 413 and past the valve 400 into the receiver assembly.

O-rings 416 and 418 are provided in middle supply valve cylinder 414 to prevent the leakage of hydraulic fluid.

The outer supply valve 500 is identical to the middle supply valve 400, both in construction and mode of operation, and, therefore, it will not be separately described herein.

A plurality of plugs 614 are provided in body 310 to prevent leakage of the hydraulic fluid from the supply valves through bores 618. One bore 618 is coupled to the fluid reservoir to vent the cylinders above pistons 326, 426 and 526. Similarly, a plurality of plugs 382 are provided in bottom plate 385 to prevent leakage of the hydraulic fluid from fluid duct 380.

A bottom plate 385 is secured to coupling body 310 by a plurality of bolts (not shown) which extend through bottom plate 385 and threadingly interact with the body 310. O-rings 620, 622 and 624 prevent the leakage of hydraulic fluid at the point where the body 310 is secured to the bottom plate 385. A locking clamp 220 is used to hold the flat surface 6 of the receiver assembly against the flat surface 610 of the supply assembly 300. The locking clamp includes clamp sections 202, 204 and 206, pivotally connected to each other by pins 210 and 212. Each of the clamp sections 202, 204 and 206 has a beveled edge 207 which mates with the beveled surface 2 on receiver assembly 5 and the beveled surface 612 on supply assembly 300. The receiver assembly is placed against the supply assembly 300, and the locking clamp 220 is fastened around the beveled surfaces 2 and 612 by fitting cylindrical members 621 and 622 through notch 609. Cylindrical member 222 is threaded to a housing 230 containing an integral pivot 228 and handle 226 pivotally mounted in the housing 230 by pin 232. The clamp 220 is locked in place by rotating the handle 226 to thread the housing tightly against the members 208.

Figure 4:
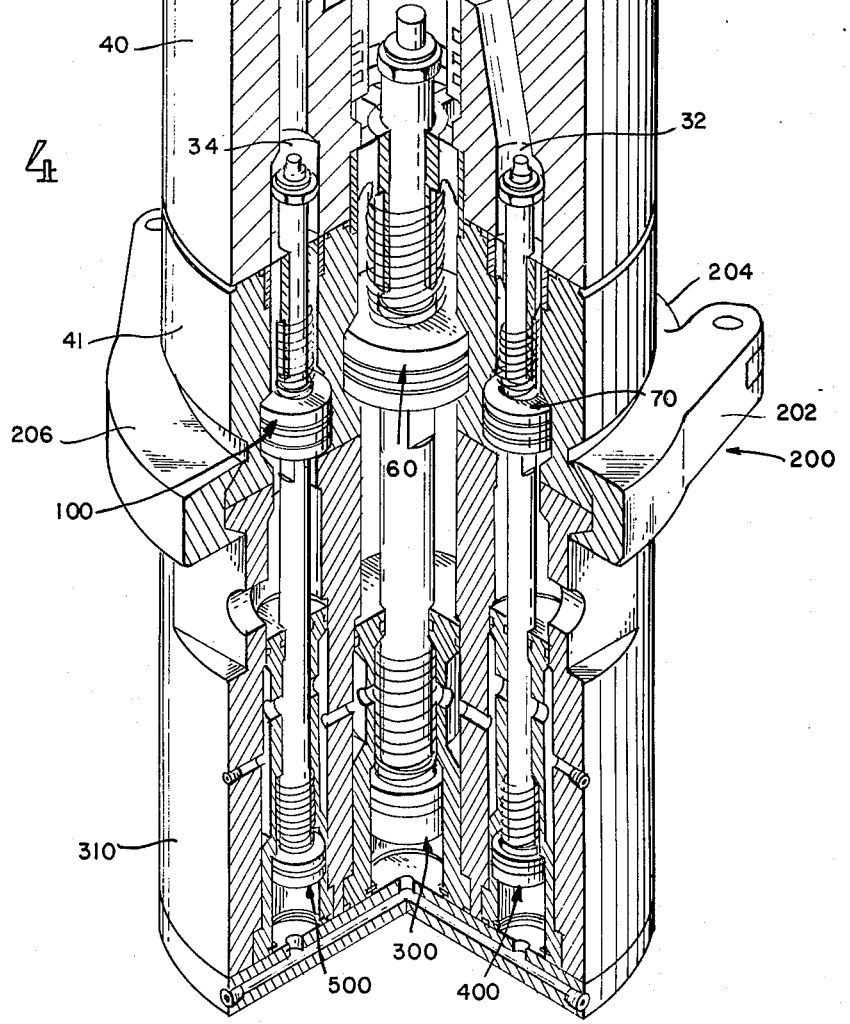
FIG. 4 is a partial cross-sectional view of the quick-disconnect coupling of the present invention showing the supply assembly connected to the receiver assembly and the valves in their open position.

The operation of the multiple-passage, quick-disconnect coupling of the present invention will now be explained with reference to FIG. 4 wherein the receiver assembly and the supply assembly are clamped together and valves 160, 70, 500, 320 and 400 are open.

The flat surface 6 of the receiver assembly is initially placed against the flat surface 610 of supply assembly 300 and held together by locking clamp 220. At this time, the valves will be in the position shown in FIG. 1. Pressurized hydraulic fluid then enters fluid port 336 and flows through the axial cylindrical bore 332 and spindle 330 to the cylinder 353. The fluid entering the cylinder 353 flows into fluid duct 380 through the aperture 360 and out through apertures 538 and 438 into cylinders 529 and 429. The pistons 526, 350 and 426 are then forced upward, thereby raising valves 320, 400 and 500 above flat surface 610, thereby opening the valves. The upward movement of the supply valves pushes the valves 100, 60 and 70 inwardly into the receiver assembly.

Since all of the valves are now open, the fluid entering fluid port 336 of inner supply valve 320 flows into the inner ram fluid port 30, thereby raising inner ram 10. Control fluid separately entering fluid port 412 is allowed to flow into middle ram fluid port 32 to initially raise the middle ram and the piston is then exposed to fluid in the inner ram port 30 for further extension. Fluid entering fluid port 512 raises the outer ram 14 in an identical manner.

When the rams are depressurized, the valves in the receiver assembly will automatically close, preventing the hydraulic fluid from escaping. Since all of the valve surfaces are flat, there are no recesses for dirt or air to collect in and contaminate the hydraulic fluid.

While the embodiment shown contains three passages, it is apparent that the present invention can readily be adapted to include more or less passages. Accordingly, the present invention is not limited to the precise structure illustrated.

The embodiments of the invention in which a particular property or privilege is claimed are defined as follows:

1. A multiple-passage, quick-disconnect coupling comprising:
   a supply assembly having an exposed flat surface;
   a plurality of supply valves within said supply assembly, each having a surface flush with the flat surface of said supply assembly wherein said supply valves are opened by extending said valves past the flat surface of said supply assembly;
   a receiver assembly having a flat surface confronting the flat surface of said supply assembly;
   a plurality of receiver valves within said receiver assembly corresponding to said supply valves and axially aligned therewith, each having a surface flush with the flat surface of said receiver assembly wherein said receiver valves are opened by depressing said receiver valves inwardly of the flat surface of said receiver assembly;
   hydraulic means for simultaneously extending said supply valves, thereby depressing said receiver valves to open said supply and receiver valves;
   an inlet port in communication with each of said supply valves;
   an exit port in communication with each of said receiver valves; and
   means for holding the flat surface of said supply assembly against the flat surface of said receiver assembly.

2. A multiple-passage, quick-disconnect coupling as in claim 1 wherein one of said inlet ports is also a fluid control port and said hydraulic means are activated by fluid flowing into said fluid control port.

3. A multiple-passage, quick-disconnect coupling as in claim 2 wherein each of said supply valves is operatively associated with a supply valve assembly, comprising:
   a cylinder;
   a piston mounted within said cylinder; and
   a spindle having one end connected said piston and the other end connected to its corresponding supply valve.

4. A multiple-passage, quick-disconnect coupling as in claim 3 wherein said hydraulic means comprises a control conduit means for allowing fluid communication between said control fluid port and each of said cylinders.

5. A multiple-passage, quick-disconnect coupling as in claim 4 wherein one of said supply valve assemblies includes:

a spindle having an axial bore in communication with its corresponding cylinder and at least one aperture allowing fluid communication between the bore and said fluid control port; and a fluid duct providing communication between all of said cylinders.

6. A multiple-passage, quick-disconnect coupling comprising:

A. a supply assembly having a flat surface including:

a plurality of supply valves flushly mounted in the flat surface of said supply assembly and opened by extending each said supply valve outward from the flat surface of said supply assembly;

a cylinder corresponding to each of said supply valves;

a piston mounted within each of said cylinders;

a plurality of spindles, each spindle having one end connected to one of said pistons and the other end connected to its corresponding supply valve;

means for passing pressurized fluid into each of said cylinders against said piston, thereby opening said supply valves; and inlet means for each of said supply valves;

B. a receiver assembly having a flat surface including:

a receiver valve corresponding to and axially aligned with each of said supply valves and flushly mounted in the flat surface of said receiver assembly wherein each of said receiver valves opens by being depressed inward by said supply valves when pressurized fluid acts against said pistons; and C. means for holding the flat surface of said supply assembly against the flat surface of said receiver assembly.

7. A multi-cylinder hydraulic ram comprising:

a rigid supply assembly having at least one flat surface;

a plurality of supply valves within said supply assembly having a surface flush with the flat surface of said supply assembly;

fluid means for opening said supply valves by extending said supply valves beyond the flat surface of said supply assembly;

an inlet port in communication with each of said supply valves;

a ram assembly having at least one flat surface and a plurality of rams;

a ram valve corresponding to and axially aligned with each of said supply valves and having a surface flush with the flat surface of said ram assembly, said ram valves being open when said ram valves are depressed into the flat surface of said ram assembly;

a piston integrally formed by each of said rams;

cylinders in communication with each of said ram valves; and means for rigidly and releasably holding the flat surface of said ram assembly against the flat surface of said supply assembly for joining said inlet ports with said cylinders.

8. A multi-cylinder hydraulic ram as in claim 7 wherein means are provided for allowing fluid to flow from one of said cylinders to another when one of said pistons has been extended a predetermined distance further than another.

9. A quick-disconnect coupling comprising:

a supply assembly having a plurality of axial first ports, each sealed by a supply valve which opens by moving axially outward, a receiver assembly having a plurality of axial second ports each sealed by a receiver valve which opens by moving axially inward and adapted to be rigidly interlocked with said supply assembly, with said first and second ports in axial alignment, said supply valve when in an opened position extending axially into said receiver assembly beyond the closed position of the receiver valve such that extending the supply valve will push open the receiver valve, means for passing pressurized fluid to said supply valves for opening said supply valves and extending the valves with the pressurized fluid into engagement with said receiver valves and thereby also opening said receiver valves, and means for passing pressurized fluid past said opened valves.

10. The coupler of claim 9, said receiver and supply valves including at least one main valve and a secondary valve, said main valve providing passage means communicating with said secondary valves for automatically opening said secondary valve upon the opening of said main valve.

11. The coupler of claim 10, said main and secondary valves each including a valve closure, an actuating piston and a rigid stem connecting the valve closure with the actuating piston, and means sealing the valve closure from said actuating piston, said passage means including an axial bore in said stem of said main supply valve.

12. A quick-disconnect coupling comprising:

a supply assembly having a plurality of axial first ports, each sealed by a valve, a receiver assembly having a plurality of axial second ports each sealed by a receiver valve and adapted to be rigidly interlocked with said supply assembly, with said first and second ports in axial alignment, means for passing pressurized fluid to said supply valves for opening said supply valves by extending the valves into engagement with said receiver valves and thereby also opening said receiver valves, and means for passing pressurized fluid past said opened valves, said first and second ports terminating in and surrounded by smooth confronting end surfaces, respectively, on said supply and receiver assemblies, said valves each having an end closure spring-biased into a closed position lying flush with said end surfaces.

13. The coupling of claim 9, including clamp means for rigidly interconnecting the receiver and supply assemblies.

* * * * *